Nov. 11, 1941.　　　W. H. BUTLER　　　2,262,095
BED LOCK HOLDER
Filed July 7, 1938
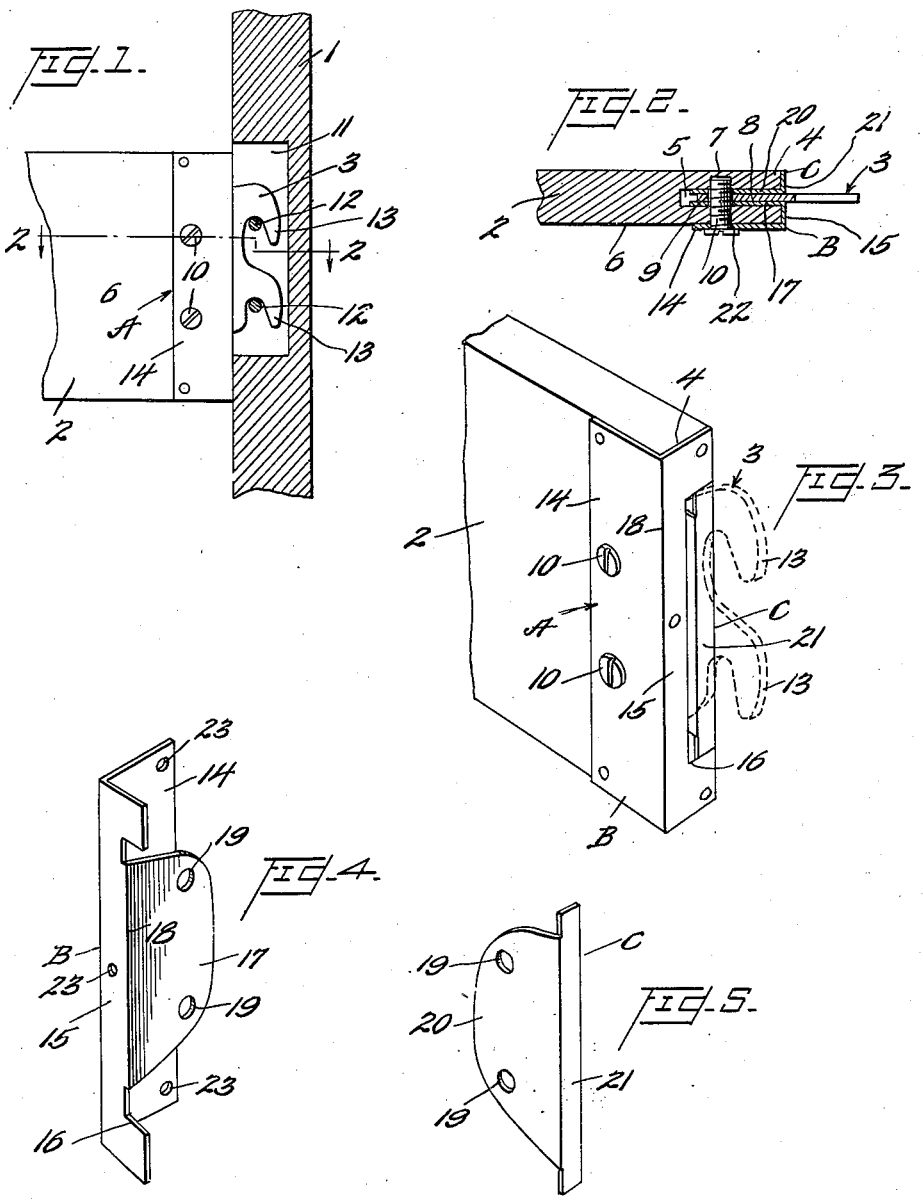

Patented Nov. 11, 1941

2,262,095

UNITED STATES PATENT OFFICE 2,262,095

BED LOCK HOLDER

Walter H. Butler, Atlanta, Ga.

Application July 7, 1938, Serial No. 217,981

3 Claims. (Cl. 5—296)

Generically this invention relates to joints, but more especially it is directed to a joint particularly adapted for use in connecting the side bars and corner posts of bedsteads and embodying a holder means for the lock member of the joint.

One of the principal objects of this invention is the provision of a holder device of this character comprising means for rigidly securing and retaining the lock or hook plate portion of the joint with the side bar, and capable of being mounted as a unit with the lock plate.

Another important object of this invention is the provision of means for holding the lock or hook-plate member of the joint, said means attachable to the respective ends of each side bar and adapted for connection with the side bar and lock-plate in such a manner as to prevent tearing loose of said lock-plate from said side bar during its operative connection with the supporting post of a bedstead.

In bedsteads, especially of the wooden sidebar type, where the lock or hook connecting means extends through openings in the side bar, continued usage causes the bolts or other connecting means to enlarge the openings causing the lock-plate to become loose, and in many instances completely tearing out, rendering the bedstead useless, and, therefore another important object of this invention is the provision of a sectional holder or mounting attachment adapted to extend within the end of the side bar on opposite sides of the hook plate, thereby taking up any play at such point, and extending over the end and adjacent side surface of the side bar in such a manner that the side bar, the holder sections, and the hook plate will be interconnected and firmly secured to each other irrespective of whether the openings in the side bar are torn out or not, and if torn out such damaged portion is concealed and the lock plate firmly secured and maintained against displacement.

Another important object of this invention is the provision of a bed lock holder of this character constituting a lining for the opening in the end of the side bar adapted to receive the hook or lock plate and a facing for the end and adjacent side of the side bar, whereby the hook is firmly attached, and the end of the side bar strengthened without marring its exposed surface irrespective of whether its end has been damaged or not.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a fragmentary side elevation of the side bar operatively connected to the bed post shown in section.

Fig. 2 is a sectional view taken on the line 2—2 of Fig. 1.

Fig. 3 is a fragmentary perspective view of the side bar showing my improved bed lock holder connected thereto.

Fig. 4 is a perspective view of one of the sectional holder plates.

Fig. 5 is a perspective view of the complemental holder plates.

In connection with joints for securing the side bars to the bed posts, especially in connection with those of the wooden type, experience has taught that the bed lock or hook plate soon becomes loose, and often the holes through which extend the securing bolts tear out, and it was to overcome such disadvantages by providing a holder for the hook plate or bed lock comprising complemental sections adapted to overlyingly engage opposite sides of the hook plate and provide a facing for the end of the side bar, one of said sections extending over the normally unexposed side surface of the side bar adjacent its end, said holder sections having aligned openings registering with the side bar and hook plate openings, and bolt means extending therethrough firmly securing said lock and holder in interconnected relation, and additional means for attaching the holder to said side bar, whereby the lock plate is rigidly maintained against displacement irrespective of whether the end of the side bar has become worn or damaged, that I designed the bed lock holder forming the subject matter of this invention.

In the illustrated embodiment characterizing this invention there is shown a corner post 1 of a bedstead, side bar 2, and bed lock or hook plate 3, of conventional construction.

The side bar 2 is formed in its ends 4 with a recess 5, and in its normally concealed side 6 and intersecting said recess 5 with aligned countersunk openings 7. Said bed lock or hookplate 3 is formed in its body portion 8 with openings 9 adapted to register with said openings 7.

The lock plate 3 is adapted for insertion in recess 5 and is secured by bolts 10 threadedly engageable in openings 7 and extending through openings 9.

The corner post 1 is formed with a cut out portion 11 having mounted therein the transverse pins 12 over which is adapted to engage the correspondingly spaced hooks 13 of the bed lock or hook-plate 3 to operatively connect side bar 2 and corner post 1 when the bedstead is in erected position, as will be well understood and as clearly shown in Fig. 1 of the drawing.

While in the present instance two hooks 13 are shown, it is to be understood that one hook 13 may be employed if desired, without affecting the spirit or scope of this invention, since the construction is standard of the body portion 8 and spacing of openings 9 with respect to openings 7.

In order to maintain the bed lock or hook-plate 3 firmly mounted in recess 5 of side bar 2, as above described, and to compensate for lost play by reason of the enlargement of openings 7 and their subsequent tearing out through the ends 4 due to the stress of continued usage, I have provided the bed lock holder A constituting the side bar strengthening and bed lock retaining and reinforcing means now to be described.

The holder A is adapted to be stamped out of sheet metal or other suitable material, or cast or otherwise formed as desired, and comprises the complemental holder sections B and C. Section B is formed with a side portion 14 and end facing portion 15 bent at right angles thereto, said facing being recessed at one edge as at 16, and having a wing portion 17 bent on the line 18 into parallelism with portion 14 and of a configuration substantially corresponding to the body portion 8 of plate 3 and formed with openings 19 adapted to register with openings 9 when operatively positioned. The complemental section C is formed with a wing member 20 provided with openings 19 and corresponding to wing member 17 just described, and is formed with a laterally extending end facing portion 21 adapted when operatively positioned to fit in said recess 16 and form a continuation of facing 15 on the opposite sides of hook or lock plate 3, as will directly more fully appear.

In order to operatively mount holder A with respect to side bar 2, it is only necessary to insert wings 17 and 20 in recess 5 overlying the opposite walls thereof, with portion 14 overlying side 6 and facing portions 15 and 21 superimposed on end 4, and insert lock plate 3 intermediate said wing portions 17 and 20, bringing openings 22 formed in portion 14 and openings 7 and 9 into registration, so that when bolts 10 are inserted and tightened and screws or other fastening elements adapted to extend through openings 23 formed in the side portion 14 and facing 15 are inserted, said holder sections B and C, lock plate 3, and side bar 2 will be united into a unitary structure, as will be well understood.

It will thus be seen that when the holder A embracing lock plate 3 is mounted as above described, wing portions 17 and 20 constitute liners for the opposite wall surfaces of recess 5 and a reinforcement for the lock plate 3, so that when bolts 10 are operatively positioned the end of the side bar 2 is strengthened, the lock plate 3 firmly held against displacement, and wear of openings 7 by bolts 10 and the opposite walls of recess 5 by plate 3 prevented.

While the fastening or anchor means has been referred to as bolts, it is to be understood that pins may be used having their ends flush with the surface of portion 14 if desired.

It will be noted that while my bed lock holder device is designed as an attachment to side bars that have become damaged and practically useless, not only restoring their usefulness, concealing the damaged portion, and, without the device being visible from the exposed side of the bar, it may, with equal facility, be applied to bedsteads at the time of their manufacture to prevent damage by reason of usage and to increase their life, as will be apparent.

From the above it will be apparent that I have designed a bed lock holder applicable to bedsteads of the woden type, simple in construction, easily installable without change to existing structures, manufacturable at a minimum of cost, and efficient for the purposes intended.

Although in practice it has been found that the form of the invention illustrated in the accompanying drawing and referred to in the above description as the preferred embodiment is the most efficient and practical, yet realizing the conditions concurrent with the adoption of the invention will necessarily vary, it is well to emphasize that various minor changes in details of construction, proportion and arrangement of parts, may be resorted to within the scope of the appended claims without departing from or sacrificing any of the principles of this invention.

Having thus described the invention, what is desired protected by Letters Patent is as set forth in the following claims:

1. In a device of the character described, the combination with a side rail, a recess in the end of the side rail, a hook plate in said recess secured to said side rail, of complemental end plates provided with interfitting end portions and laterally spaced wings, said wings projecting into said recess on opposite sides of said hook plate, and fastening means securing all of said plates to the side rail.

2. In a device of the character described, the combination with a side rail, a recess in the end of the side rail, a hook plate in said recess, of complemental end plates provided with interfitting end portions and laterally spaced wings, said wings projecting into said recess on opposite sides of said hook plate, one of said end plates having a side plate engaging the outer side surface of the rail, and fastening means securing said plate to the rail and said hook plate to said wings.

3. In a device of the character described, the combination with a side rail, a recess in the end of the side rail, a hook plate in said recess, of complemental end plates provided with interfitting end portions and laterally spaced wings, said wings projecting into said recess on opposite sides of said hook plate, one of said end plates having a side plate laterally spaced from its wing plate engaging the outer surface of the rail, fastening means securing the side plate to the side rail, and additional means securing the hook plate to the wings.

WALTER H. BUTLER.